US010246639B2

(12) United States Patent
Abu-Ali et al.

(10) Patent No.: US 10,246,639 B2
(45) Date of Patent: Apr. 2, 2019

(54) FIRE RETARDANT COMPOSITIONS AND CABLE SEPARATORS FORMED THEREOF

(71) Applicant: General Cable Technologies Corporation, Highland Heights, KY (US)

(72) Inventors: Amjad F. Abu-Ali, Loveland, OH (US); Laura Ann Weiss, Fort Mitchell, KY (US); Qian Zhu, Jonesboro, AR (US); Stephen A. Thwaites, Walton, KY (US)

(73) Assignee: General Cable Technologies Corporation, Highland Heights, KY (US)

( * ) Notice: Subject to any disclaimer, the term of this patent is extended or adjusted under 35 U.S.C. 154(b) by 0 days.

(21) Appl. No.: 15/597,486

(22) Filed: May 17, 2017

(65) Prior Publication Data

US 2017/0335197 A1    Nov. 23, 2017

Related U.S. Application Data

(60) Provisional application No. 62/337,378, filed on May 17, 2016.

(51) Int. Cl.
| | |
|---|---|
| *C08K 3/22* | (2006.01) |
| *C08K 5/02* | (2006.01) |
| *C08K 5/12* | (2006.01) |
| *H01B 3/44* | (2006.01) |
| *C08K 13/02* | (2006.01) |
| *C08K 5/098* | (2006.01) |
| *C08K 5/521* | (2006.01) |
| *C08L 27/06* | (2006.01) |
| *C09K 21/02* | (2006.01) |

(Continued)

(52) U.S. Cl.
CPC ............... *C09K 21/08* (2013.01); *C08K 3/22* (2013.01); *C08K 5/02* (2013.01); *C08K 5/098* (2013.01); *C08K 5/12* (2013.01); *C08K 5/521* (2013.01); *C08K 13/02* (2013.01); *C09K 21/02* (2013.01); *H01B 3/448* (2013.01); *H01B 7/295* (2013.01); *C08K 2201/014* (2013.01); *C08K 2201/019* (2013.01)

(58) Field of Classification Search
CPC ..................................................... C09K 21/08
See application file for complete search history.

(56) References Cited

U.S. PATENT DOCUMENTS

| | | |
|---|---|---|
| 2007/0027254 A1 | 2/2007 | Kawata et al. |
| 2012/0267142 A1 | 10/2012 | Nordin et al. |

(Continued)

FOREIGN PATENT DOCUMENTS

WO    2015187299 A1    12/2015

OTHER PUBLICATIONS

Young, Lee W.; International Search Report and Written Opinion of the International Searching Authority, issued in International Application No. PCT/US2017/033040; dated Aug. 16, 2017; 8 pages.

(Continued)

*Primary Examiner* — Peter F Godenschwager
(74) *Attorney, Agent, or Firm* — Ulmer & Berne LLP (57) ABSTRACT

A fire retardant composition is disclosed. The composition includes polyvinyl chloride, a plasticizer, a brominated fire retardant additive, a fire retardant synergist, and a metal stabilizer. Cable separators formed of the fire retardant composition are also disclosed.

18 Claims, 4 Drawing Sheets

(51) Int. Cl.
*C09K 21/08* (2006.01)
*H01B 7/295* (2006.01)

(56) References Cited

U.S. PATENT DOCUMENTS

| | | |
|---|---|---|
| 2013/0137789 A1 | 5/2013 | Olsen et al. |
| 2013/0213686 A1 | 8/2013 | Jiang et al. |
| 2015/0353711 A1 | 12/2015 | Zucchelli |
| 2015/0357095 A1 | 12/2015 | Siripurapu et al. |

OTHER PUBLICATIONS

"What are Halogens and why are they dangerous?" posted by frcables, Jul. 28, 2011; retrieved from https://frcables.wordpress.com/2011/07/20/what-are-halogens-and-why-are-they-dangerous-%E2%80%93-fire-resistant-cables/ on Jul. 11, 2017; 1 page.
Seymour, R. B. et al.; "History of Polymeric Composites"; Proceeding of the Symposium held during the 192nd ACS National Meeting, Sep. 10-12, 1986; p. 289.
Rouse, Margaret; "dielectric constant," Jul. 2015: retrieved from http://whatis.techtarget.com/definition/dielectric-constant on Jul. 11, 2017; 1 page.
Coonrod, John et al.; "Digging Deeper Into Dissipation Factor"; Microwave Journal Frequency Matters, Aug. 21, 2013; retrieved from http://www.microwavejournal.com/blogs/1-rog-blog/post/20436-digging-deeper-into-dissipation-factor on Jul. 11, 2017; 2 pages.
Zeus Industrial Products, Inc.; "Dielectric Properties of Polymers"; 2005; retrieved from http://www.appstate.edu/~clementsjs/journalarticles/zeus_dielectric.pdf on Jul. 11, 2017; 7 pages.

FIRE RETARDANT COMPOSITIONS AND CABLE SEPARATORS FORMED THEREOF

REFERENCE TO RELATED APPLICATIONS

The present application claims the priority benefit of U.S. provisional application Ser. No. 62/337,378, entitled FIRE RETARDANT COMPOSITIONS AND CABLE SEPARATORS FORMED THEREOF, filed May 17, 2016, and hereby incorporates the same application by reference in its entirety.

TECHNICAL FIELD

The present disclosure generally relates to fire retardant compositions formed of polyvinyl chloride and cable separators formed thereof.

BACKGROUND

Fire retardant compositions can be useful as a construction material for a variety of articles and structures. For example, aerospace materials and plenum building materials are often required to pass stringent fire certification standards due to the risk of fires breaking out in enclosed spaces. Traditional fire retardant polymers for such applications suffer from a number of undesirable attributes however including high cost, degradation of mechanical and electrical properties, and health concerns caused by the inclusion of fire retardant additives. Consequently, there is a need for inexpensive polymeric materials that can meet, or exceed, the physical and electrical requirements of traditional fire-retardant polymers without suffering from the drawbacks associated with such materials. It would also be useful if such improved fire retardant compositions could be used as a cable separator for a cable.

SUMMARY

In accordance with one example, a fire retardant composition includes polyvinyl chloride, about 10 parts to about 40 parts, by weight, of a plasticizer, about 0.1 part to about 25 parts, by weight, of a brominated fire retardant additive, about 25 parts to about 75 parts, by weight, of a fire retardant synergist, and about 1 part to about 10 parts, by weight, of a mixed metal stabilizer. The plasticizer includes one or more of a trimellitate ester and a phosphate ester. The fire retardant synergist includes a metal hydroxide. The fire retardant composition is substantially free of a halogenated plasticizer.

In accordance with another example, a fire retardant composition includes polyvinyl chloride, about 10 parts to about 40 parts, by weight, of a plasticizer, about 0.1 part to about 25 parts, by weight, of a brominated fire retardant additive, about 0.1 part to about 25 parts, by weight of a second fire retardant additive, about 25 parts to about 75 parts, by weight, of a fire retardant synergist, and about 1 part to about 10 parts, by weight, of a mixed metal stabilizer. The plasticizer includes one or more of a trimellitate ester and a phosphate ester. The second fire retardant additive includes antimony trioxide. The fire retardant synergist includes a metal hydroxide. The fire retardant composition is substantially free of a halogenated plasticizer.

In accordance with another example, a cable separator includes a pre-shaped body formed of a fire retardant composition. The fire retardant composition includes polyvinyl chloride, a plasticizer, a brominated fire retardant additive, a fire retardant synergist, and a mixed metal stabilizer. The plasticizer includes one or more of a trimellitate ester and a phosphate ester. The fire retardant synergist includes a metal hydroxide. The fire retardant composition is substantially free of a halogenated plasticizer.

DETAILED DESCRIPTION

As will be described herein, an improved fire retardant composition is disclosed which is useful as a construction material for fire retardant articles and structures. Such improved fire retardant compositions can be formed from polyvinyl chloride ("PVC") and can include a halogenated fire retardant additive while being substantially free of halogenated plasticizers.

As can be appreciated, conventional fire retardant PVC compositions typically include halogenated plasticizers. Applicant has unexpectedly discovered that fire retardant compositions formed with PVC and also including trimellitate ester plasticizers and/or phosphate ester plasticizers can produce fire retardant compositions that retain the favorable mechanical properties expected of traditional PVC compositions without requiring a halogenated plasticizer. For example, an improved fire retardant composition including a halogenated fire retardant additive and one or more of a trimellitate ester plasticizer and a phosphate ester plasticizer can exhibit durability and flexibility comparable to that of known fire retardant PVC compositions.

As used herein, halogenated plasticizer can mean any halogenated plasticizer as known in the art including halogenated phthalates such as brominated phthalate esters, chlorinated phthalate esters, brominated trimellitate esters, and chlorinated trimellitate esters; halogenated paraffins such as brominated paraffins and chlorinated paraffins; and chlorinated polyethylene.

A variety of non-halogenated trimellitate esters and phosphate esters can be used as a plasticizer for the improved fire retardant compositions described herein. For example, in certain embodiments, a linear $C_8$-$C_{10}$ trimellitate ester, such as tris-(octyl, decyl)-trimellitate (8-10TM) can be used as a suitable plasticizer. Other trimellitate esters suitable for inclusion as a plasticizer can include tri (heptyl, nonyl) trimellitate ("79TM"), linear trinonyltrimellitate ("L9TM"), triisononyl trimellitate ("TINTM") and, tri octyl trimellitate ("TOTM"). Alternatively, or in addition, a phosphate ester such as an organic phosphate ester, or a phosphate ester blend can be used. For example, phosphoric acid dodecyl ester diphenyl ester (Santicizer 2148 from Valtris Specialty Chemicals (Independence, Ohio), Santicizer 2248, Santicizer 148, and Phosflex 148 from ICL Industrial Products (St. Louis, Mo.) can each be used as plasticizer in certain embodiments. Generally, the one, or more, plasticizers can be included in an improved fire retardant composition at about 5 parts to about 35 parts, by weight, in certain embodiments; from about 10 parts to about 30 parts, by weight, in certain embodiments; from about 15 parts to about 25 parts, by weight, in certain embodiments; and at about 20 parts, by weight, in certain embodiments.

In certain embodiments, an additional phthalate plasticizer can optionally be included. For example, in certain embodiments, a phthalate plasticizer such as diundecyl phthalate ("DUP"), dioctyl phthalate ("DOP"), diisononyl phthalate ("DINP"), and/or diisodecyl phthalate ("DIDP") can be included in an improved fire retardant composition.

According to certain embodiments, a suitable halogenated fire retardant additive, such as a brominated or chlorinated additive, can be included in an improved fire retardant composition to increase the fire resistance properties of the composition. Generally, any known brominated or chlorinated fire retardant additive can be used as known in the art. For example, in certain embodiments, ethylene bis(tetrabromo phthalimide) and/or polybrominated diphenyl ether can be used as a suitable brominated fire retardant additive. In certain embodiments, a brominated fire retardant additive can be selected. A suitable halogenated fire retardant additive can be included at about 0.1 part to about 25 parts, by weight, in certain embodiments; at about 5 parts to about 20 parts, by weight, in certain embodiments; and at about 10 parts to about 15 parts, by weight, in certain embodiments.

As can be appreciated, a variety of additional components can be included in an improved fire retardant composition to further improve the fire retardant properties of the composition. For example, one, or more, additional fire retardant additives and fire retardant synergists can be included in certain embodiments.

For example, in certain embodiments, additional fire retardant additives can optionally be included in combination with the halogenated fire retardant additive. The use of an additional fire retardant additive can increase the ability of an improved fire retardant composition to resist flame spread and can raise the limiting oxygen index of the composition. In certain embodiments, the additional fire retardant additive can be selected from one or more of antimony trioxide, zinc hydroxystannate, zinc borate, and zinc oxide. When included, the additional fire retardant additive can be included at about 0.1 part to about 25 parts, by weight, in certain embodiments; from about 0.5 part to about 10 parts, by weight, in certain embodiments; from about 1 part to about 5 parts, by weight, in certain embodiments; and at about 3 parts, by weight, in certain embodiments.

In certain embodiments including an additional fire retardant additive, the additive can be included in relatively smaller quantities than the halogenated fire retardant. For example, if an improved fire retardant composition includes about 13 parts, by weight, of a brominated fire retardant, only about 3 parts, by weight, of an additional fire retardant additive can be necessary.

The efficacy of a halogenated fire retardant additive can be further enhanced in certain embodiments through inclusion of a fire retardant synergist such as a metal hydroxide. For example, in certain embodiments, aluminum hydroxide and/or magnesium hydroxide can be included to synergistically improve the fire retardant properties of the composition. In certain embodiments, a fire retardant synergist can be selected for qualities such as a low ionic content, or for having an average particle size of about 0.5 micron to about 3 microns. A fire retardant synergist can be included at about 25 parts to about 75 parts, by weight, in certain embodiments; at about 35 parts to about 65 parts, by weight, in certain embodiments; and at about 40 parts to about 55 parts, by weight, in certain embodiments.

As can be appreciated, an improved fire retardant composition as described herein can additionally include a variety of additional components to further tailor the properties of the composition. For example, one or more smoke suppressants and char formers, stabilizers, and lubricants can be included to limit the spread of smoke, improve the compatibility of the various components included in the compositions, or to improve the processability of the compositions.

For example, in certain embodiments, suitable compounds can be added to a fire retardant composition to suppress smoke or increase char formation of the burning composition. As used herein, such compounds are generally referred to smoke suppressants. As can be appreciated, the effects of such compounds can be highly desirable for a fire retardant composition. In certain embodiments, suitable smoke suppressants can include engineered ammonium octamolybdate compounds and blends. As can be appreciated however, certain compounds such as one or more of zinc borate, zinc molybdate, zinc calcium molybdate, zinc oxide, zinc sulfide, molybdenum, zinc hydroxystannate, and derivatives thereof can also exhibit smoke suppressant properties and can additionally, or alternatively, be included as a suitable smoke suppressant. In certain embodiments, commercial smoke suppressant blends, such as Kemgard HPSS from J.M. Huber Corp. (Edison, N.J.) can also be used. In certain embodiments including such smoke suppressants, the smoke suppressants can be included in the improved fire retardant compositions at about 0.1 part to about 40 parts, by weight.

In certain embodiments, a stabilizer can be included to improve the compatibility of the components included in the composition as well as the stability and lifetime of the composition. In such embodiments, preferred stabilizers can include mixed metal stabilizers such as those based on calcium and zinc chemistries. For example, a calcium hydroxide metal stabilizer or a calcium-zinc metal carboxylate stabilizer can be used in certain embodiments. In certain embodiments, commercial stabilizers such as Therm-Check stabilizers produced by Ferro Corp. (Mayfield Heights, Ohio) can also be used. In embodiments including a stabilizer, the stabilizer can be included at about 1 part to about 10 parts, by weight.

Lubricant can be added in certain embodiments to improve the processability of an improved fire retardant composition. In such embodiments, the lubricant can form microscopic dispersed phases within the polymer carrier. During processing, the applied shear can separate the lubricant from the carrier polymer phase. The lubricant can then migrate to the die wall to gradually form a continuous coating layer to reduce the backpressure of the extruder and reduce friction during extrusion. A suitable lubricant can generally be selected from one or more of stearic acids, calcium stearate, zinc stearate, silicones, anti-static amines, organic amities, ethanolamides, mono- and di-glyceride fatty amines, ethoxylated fatty amines, fatty acids, fatty acid esters, palmitic acids, zinc sulfate, oligomeric olefin oils, and paraffin wax. In certain embodiments, a lubricant can be included at about 5 parts or less by weight of the improved fire retardant composition; in certain embodiments at about 2 parts or less by weight of the improved fire retardant composition; and in certain embodiments at about 1 part or less by weight of the improved fire retardant composition. In certain embodiments, the improved fire retardant composition can be substantially free of a lubricant. As used herein, "substantially free" means that the component is not intentionally added to the composition and, or alternatively, that the component is not detectable with current analytical methods.

In certain embodiments, one or more functional additives can be further included in the fire retardant compositions described herein to further tailor the properties of the compositions. Generally, any known functional additive can be included to impart desirable characteristics to the compositions including, for example, filler, impact modifiers, UV stabilizers, pigments, biocide and fungicides, flexibilizers, and antistatic agents as known in the art. For example, relatively small quantities of ethylene terpolymer and titanium dioxide can be included in certain embodiments to act as a flexibilizer and pigment respectively. In certain embodiments however, an improved fire retardant composition can be substantially free of any halogenated plasticizers or polar polymers such as ethylene acrylate copolymer.

The improved fire retardant compositions described herein can be prepared by blending the components/ingredients in conventional masticating equipment such as, for example, a rubber mill, brabender mixer, banbury mixer, Buss-Ko kneader, farrel continuous mixer, or twin screw continuous mixer. The components can optionally be pre-mixed before addition to PVC. The mixing time can be selected to ensure a homogenous mixture.

As can be appreciated, PVC compositions, including the improved fire retardant compositions described herein, can exhibit high modulus strength making them particularly suitable for foaming. Foaming of an improved fire retardant composition as described herein can be beneficial for a variety of reasons. For example, foaming can reduce the density of the material resulting in both decreased weight and a reduction in the quantity of material required for a particular application. As can be appreciated, such reductions can also beneficially lower the amount of polymer material available for burning.

Foaming can also have a beneficial impact on electrical properties of the fire retardant compositions. For example, the inclusion of air in the composition can decrease the dielectric constant. As can be appreciated, such an improvement can be particularly beneficial when the fire retardant compositions described herein are used as cable separators for cables due to the greater reduction in crosstalk noise between conductor pairs in such cables.

Generally, the improved fire retardant compositions described herein can be foamed through any known process that produces fine air bubbles throughout the polymer. Non-limiting examples of suitable foaming techniques include chemical foaming and direct gas injection. Both processes can create foam through the addition of a blowing agent to the fire retardant composition.

In certain embodiments, blowing agents such as inorganic agents, organic agents, and chemical agents can be used to form the bubbles. Examples of inorganic blowing agents can include carbon dioxide, nitrogen, argon, water, air nitrogen, and helium. Such inorganic blowing agents can, be useful, for example, in direct gas injection techniques. Examples of organic blowing agents can include aliphatic hydrocarbons having 1-9 carbon atoms, aliphatic alcohols having 1-3 carbon atoms, and fully and partially halogenated aliphatic hydrocarbons having 14 carbon atoms. Exemplary aliphatic hydrocarbons that can be used include methane, ethane, propane, n-butane, isobutane, n-pentane, isopentane, neopentane, and the like. Exemplary aliphatic alcohols can include methanol, ethanol, n-propanol, and isopropanol.

According to certain embodiments, fully and partially halogenated aliphatic hydrocarbons can also be used as blowing agents and can include fluorocarbons, chlorocarbons, and chlorofluorocarbons. Examples of suitable fluorocarbons can include methyl fluoride, perfluoromethane, ethyl fluoride, 1,1-difluoroethane (HFC-152a), 1,1,1-trifluoroethane (HFC-143a), 1,1,1,2-tetrafluoroethane (HFC-134a), pentafluoroethane, difluoromethane, perfluoroethane, 2,2-difluoropropane, 1,1,1-trifluoropropane, perfluoropropane, dichloropropane, difluoropropane, perfluorobutane, perfluodichloropropane, difluoropropane, perfluorobutane, perfluorocyclobutane. Partially halogenated chlorocarbons and chlorofluorocarbons can include methyl chloride, methylene chloride, ethyl chloride, 1,1,1-trichloroethane, 1,1-dichloro-1-fluoroethane (HFC-141b), 1-chloro-1,1-difluoroethane (HCFC-142), chlorodifluoromethane (HCFC-22), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), 1,1,1-trifluoroethane, pentafluoroethane, dichlorotetrafluoroethane (CFC-114), chloroheptafluoropropane, and dichlorhexafluoropropane.

It can be appreciated that a blowing agent can be halogenated or substantially halogen-free in certain embodiments. Examples of certain halogen-free chemical blowing agents can include azodicarbonaminde, azodiisobutyronitrile, benzenesulfonhydrazide, 4,4-oxybenzene sulfonylsemicarbazide, p-toluene sulfonyl semicarbazide, barium azodicarboxylate,N,N'-dimethyl-N,N'-dinitrosoterephthalamide, trihydrazino triazine and 5-phenyl-3,6-dihydro-1,3,4-oxadiazine-2-one. As can be appreciated, blowing agents can be used in various states including as gaseous states, liquid states, and supercritical states.

Suitable foam rates for the improved fire retardant compositions described herein can include a foam rate of about 50% or less in certain embodiments, and a foam rate of about 30% or less in certain embodiments.

The improved fire retardant compositions described herein can exhibit a number of beneficial properties that make them suitable for use in a variety of different applications including aerospace and cable applications. For example, the improved fire retardant compositions can be formed into cable separators and can allow cables including such cable separators to pass the National Fire Protection Association ("NFPA") 262 (2011) and Underwriter's Laboratories ("UL") 910 (1998) commercial plenum flame tests. The improved fire retardant compositions can also exhibit a limiting oxygen index ("LOT") of about 30% or greater in certain embodiments, and about 50% or greater in certain embodiments. The LOT indicates the minimum required oxygen content for the composition to burn. The compositions can also exhibit a low temperature brittleness ("LTB") of about 10° C. when measured in accordance to an appropriate standard such as ASTM D-746.

The NFPA 262 test, also called a "Steiner Tunnel Test" uses a chamber that is 25 feet long, 18 inches wide and 12 inches tall. An 11.25 inch wide tray is loaded into the chamber with a single layer of cable and then exposed to a 300,000 btu flame for 20 minutes. A passing result on the NFPA 262 test requires the tested cables to have a flame spread of less than 5 feet, and a maximum peak optical smoke density of 0.50, and an average optical smoke density of 0.15. The NFPA 262 test requires consecutive samples to pass each of these requirements.

The fire retardant compositions described herein can also demonstrate excellent electrical and mechanical properties. For example, the compositions can exhibit a dielectric constant of about 3.4 or less when measured at about 10 MHz and a dissipation factor of about 0.02 or less when measured at about 10 MHz. The fire retardant compositions can also demonstrate excellent hardness as demonstrated by Shore Hardness A values of about 90 to about 99.

As can be appreciated, the mechanical and fire retardant properties of the fire retardant compositions described herein can make the compositions particularly suited for use as a cable separator in a data communication cable. FIGS. 1 to 8 depict various cable separators that can be formed of the fire-retardant compositions described herein.

Figure 1:
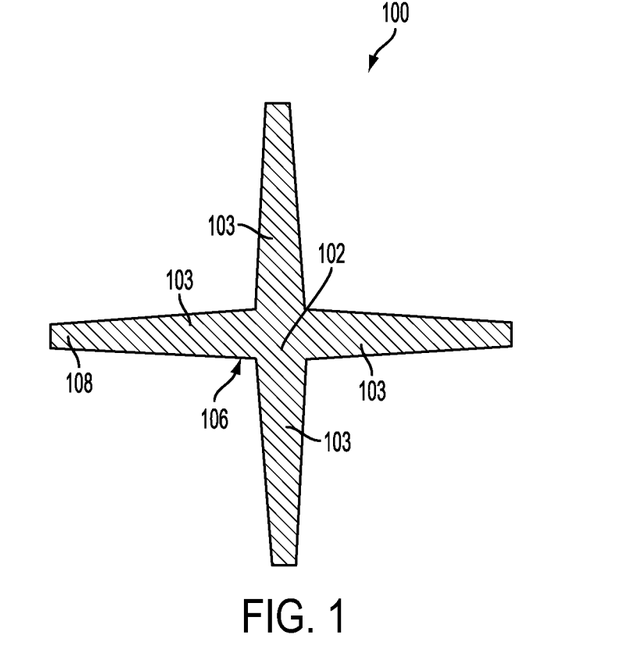
FIG. 1 depicts a cross-sectional end view of a cable separator according to one embodiment.

Referring to FIG. 1, a cable separator 100 can generally include a body 102. The body 102 can be formed of the fire-retardant composition described herein. The body 102 can have a relatively narrow cross-section, as depicted in FIG. 1, but can have an indeterminate longitudinal length to allow the cable separator 100 to be used in cables of varying lengths.

The body of a cable separator can include various features to separate, or space apart, at least one conductor in a conductive cable from other conductors in the cable. For example, in certain embodiments, the body 102 can include one, or more, projections 103 that can extend radially outward from a central portion of the body 102 to physically separate the conductors (e.g., 202 in FIG. 2). In certain embodiments, a cable separator 100 can include four such projections 103 with each projection 103 equally disposed around the central portion and perpendicular to an adjacent projection 103. However, as will be appreciated, a cable separator can alternatively include less than four projections or more than four projections depending on, for example, the number of conductors, and the desired cable geometry. As further shown in FIG. 1, each projection 103 can have a first end 106 located at the center of the body 102, and a distal end 108 located at the terminal end of the projection 103.

According to certain embodiments, each projection of a cable separator can be tapered. For example, each projection 103 can be larger near the first end 106 and can be smaller at the distal end 108 to produce a taper as depicted in FIG. 1. As can be appreciated, such projections can alternatively have a substantially similar size at the first end and at distal end to produce a uniformly flat projection (for example, projection 400 in FIG. 4) or can be larger near the distal end than the first end in other embodiments to produce an alternatively biased taper. In certain embodiments, each projection can also taper until a substantially single point is reached at the terminal end of each projection. As will be appreciated, such separators can be called star separators.

The configuration of a cable separator can be important to the separator's intended functionality and performance. As such, the body of each separator can be "preshaped" according to certain embodiments. As used herein, preshaped can mean that a separator was manufactured, or extruded, in a predetermined shape that can be maintained throughout the construction and use of the cable. Preshaped separators can be beneficial by eliminating the need for further configuration, arrangement, or manipulation of the separator during cable construction. Preshaped separators can, however, retain flexibility to allow for manipulation and temporary deformation of the separator during construction and use of the cable. In certain embodiments, a preshaped separator can prevent kinking of the cable during installation and can reduce sagging of unsupported cables.

Figure 2:
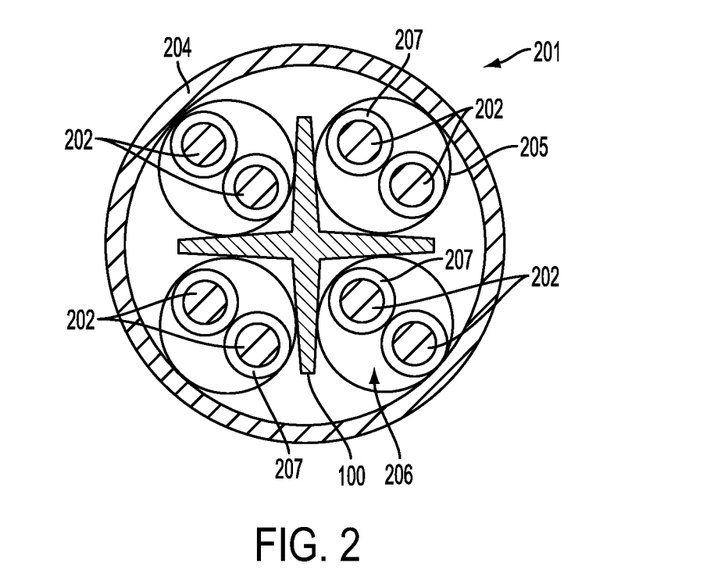
FIG. 2 depicts a cross-sectional end view of a cable incorporating the cable separator depicted in FIG. 1 according to one embodiment.

As depicted in FIG. 2, a cable separator 100 can be incorporated into a cable 201 containing a plurality of conductors 202 surrounded by an outer protective jacket 204. In certain embodiments, at least some of the plurality of conductors 202 can be further organized into twisted conductor pairs 206. Twisted conductor pairs 206 can be useful in the production of data communication cables as conductor pairs 206 can, for example, reduce undesirable crosstalk interference. In certain embodiments, the twisted conductor pairs 206 can be further shielded by a shield layer 205. As shown in FIG. 2, the cable separator 100 can separate, or space apart, each of the twisted conductor pairs 206 from the other twisted conductor pairs 206. As can be appreciated, the separator can, in certain embodiments, also, or alternatively, space apart individual conductors or other conductor groupings. As will be appreciated, individual conductors can also, in certain embodiments, by insulated. As shown in FIG. 2, each of the individual conductors 202 can have an insulation layer 207.

When used in data communication cables, a cable separator can be used to improve various electrical or physical properties necessary to achieve various certifications. For example, a cable separator can in certain embodiments, be used to help certify a data communication cable as a Category 5, Category 5e, Category 6, Category 6A, Category 7, or higher standard under TIA/EIA qualifications. Further details of data communication cables are described in U.S. Patent Application Publication No. 2012/0267142 which is hereby incorporated by reference.

In certain embodiments, a cable separator can also be used in cables with non-conductive elements. For example, a cable separator can be used in the construction of a fiber optic data cable and, in such embodiments, can separate the optical fibers.

Figure 3:
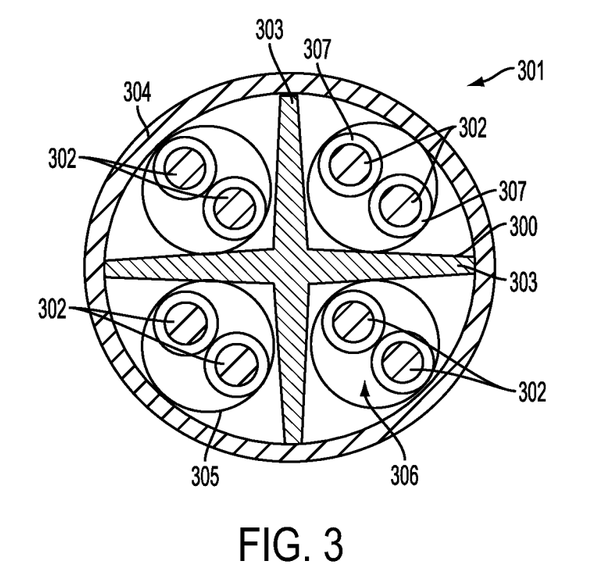
FIG. 3 depicts a cross-sectional end view of the cable including a tapered cross web cable separator according to one embodiment.

As noted above, cable separators can be preshaped to have desired configurations and sizes. For example, as illustrated in FIG. 3, a cable separator 300 used in cable 301 can be relatively larger in cross section than similarly shaped cable separator 100 and can have projections 303 that extend outwardly in length to effectively touch the inner surface the cable jacket 304. Such resizing of the cable separator 300 can provide improved separation of the conductors 302, including each of the respective twisted conductor pairs 306. In certain embodiments, twisted conductor pairs 306 can be further shielded by a shield layer 305. As shown in FIG. 3, each of the individual conductors 302 can have an insulation layer 307.

As can be appreciated, any of the cable separators shown in FIGS. 2 to 8 can be manufactured in various relative sizes compared to the size of the cable itself. Additionally, in certain embodiments, only certain elements, such as, for example, the projections can vary in size with other elements remaining similarly sized.

According to certain embodiments, the central portion of the separator 100, excluding the projections 103, can be about 0.025 inch to about 0.035 inch in width and the separator as a whole can be about 0.14 inch to about 0.25 inch in width and height. However, as can be appreciated, the dimensions of a cable separator can vary depending on the number of conductors, the gauge of the conductors, and the overall gauge of the cable the separator is intended for use within.

Figure 4:
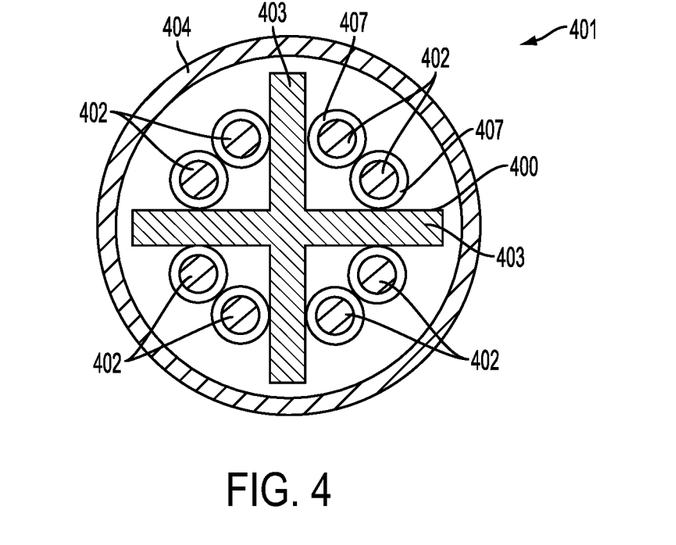
FIG. 4 depicts a cross-sectional end view of the cable including a straight-sided cable separator according to one embodiment.

Cable separators can also have a variety of alternative cross-sectional shapes to the cross-web illustrated in FIGS. 1 to 3. For example, in FIG. 4, the cable separator 400 in cable 401 can be a straight-sided and can have flat projections 403 instead of tapered projections. These flat projections 403 of the cable separator 400 can provide improved separation of the conductors 402. In certain embodiments, the cable separator 400 can substantially extend to effectively touch an outer protective jacket 404. As shown in FIG. 4, each of the individual conductors 402 can have an insulation layer 407.

Figure 5:
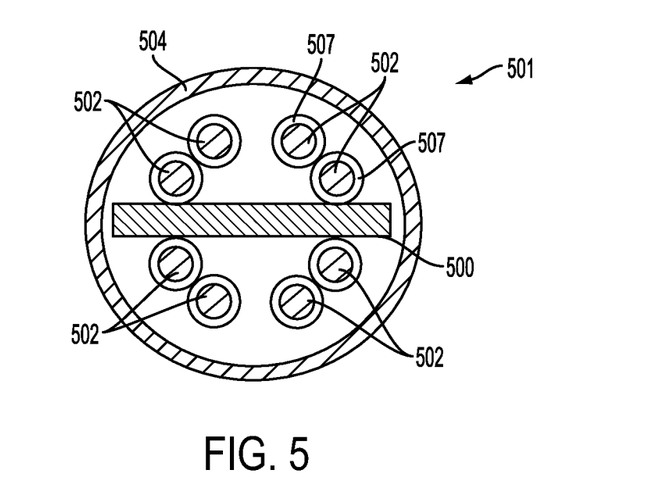
FIG. 5 depicts a cross-sectional end view of the cable including a tape cable separator according to one embodiment.

In FIG. 5, the cable separator 500 in cable 501 can have a tape configuration and can have a substantially flat body without discrete projections. The conductors 502 can be generally separated by the cable separator 500 as shown in FIG. 5 providing improved separation of the conductors 502. In certain embodiments, the cable separator 500 can substantially extend to an outer protective jacket 504. As shown in FIG. 5, each of the individual conductors 502 can have an insulation layer 507. In other embodiments, the cable separator 500 can be tapered and can contain a thicker central portion with narrowing end portions.

Figure 6:
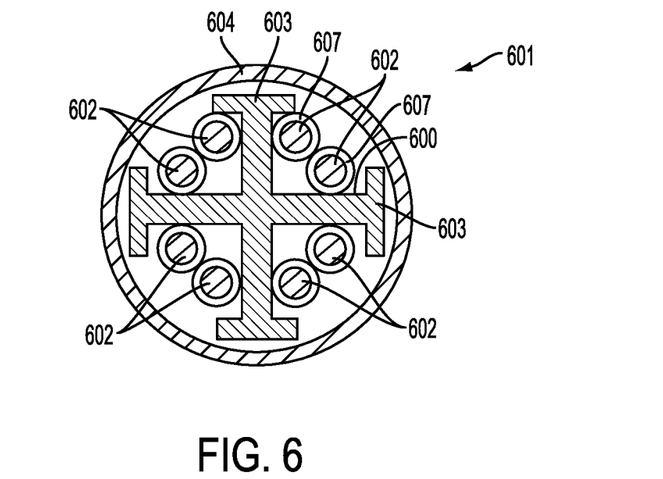
FIG. 6 depicts a cross-sectional end view of the cable including a T-top cable separator according to one embodiment.

Cable separators can also have other, different cross-sectional shapes. For example, in FIG. 6, the cable separator 600 in cable 601 can have a T-top configuration such that each projection 603 includes a T-shaped arrangement. Such a T-shaped arrangement for the projections 603 can be used to further space apart, or secure, the conductors 602 in the cable 601. Thus, the cable separator 600 can provide improved separation of the conductors 602. In certain embodiments, the cable separator 600 can substantially extend to effectively touch an outer protective jacket 604. As shown in FIG. 6, each of the individual conductors 602 can have an insulation layer 607.

Figure 7:
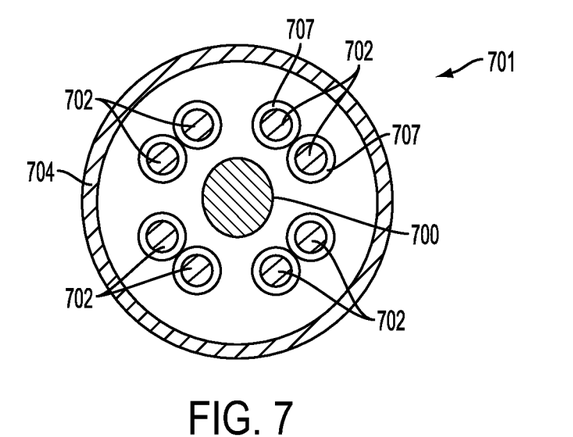
FIG. 7 depicts a cross-sectional end view of the cable including a circular filler cable separator according to one embodiment.

In FIG. 7, the cable separator 700 in cable 701 can have a circular configuration without projections. Such a separator 700 can still provide separation among the conductors 702 by compressing the conductors 702 against the outer protective jacket 704. Thus, the cable separator 700 can provide improved separation of the conductors 702. As shown in FIG. 7, each of the individual conductors 702 can have an insulation layer 707.

Figure 8:
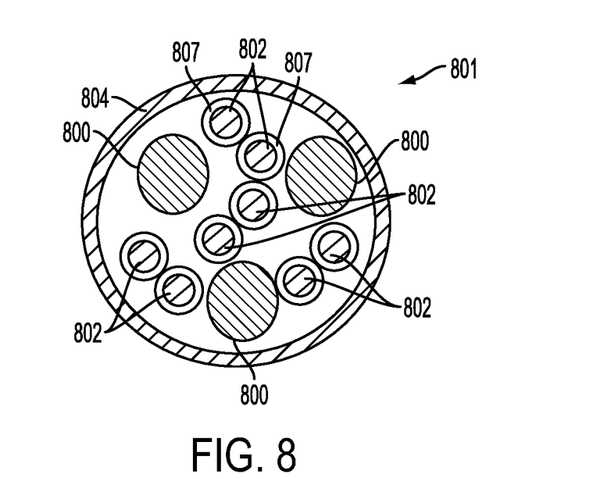
FIG. 8 depicts a cross-sectional end view of the cable including multiple circular filler cable separators according to one embodiment.

As depicted in FIG. 8, multiple circular separators 800 can also be used in a single cable 801 according to certain embodiments. The cable separator 800 can provide improved separation of the conductors 802, including compressing at least some of the conductors 802 against the outer protective jacket 804. As shown in FIG. 8, each of the individual conductors 802 can have an insulation layer 807. As will be appreciated, circular cable separators can be formed as a substantially solid article (as generally shown in FIGS. 7 and 8) or can be hollow. As will also be appreciated, a single cable can also, in certain embodiments, include multiple cable separators with alternative cross-sectional shapes such as, for example, cross-web shapes.

EXAMPLES

Various PVC compositions were prepared to demonstrate the properties of improved fire retardant compositions and are depicted in Tables 1 and 2. Example 1 is comparative because it includes a halogenated plasticizer. Examples 2 to 8 are Inventive Examples because each includes a trimellitate ester or phosphate ester plasticizer and exhibit desirable qualities.

TABLE 1

| Component (in parts by weight) | 1 | 2 | 3 | 4 | 5 | 6 | 7 | 8 |
|---|---|---|---|---|---|---|---|---|
| PVC | 100 | 100 | 100 | 100 | 100 | 100 | 100 | 100 |
| Ethylene bis(tetrabromo phthalimide) | — | 13 | 13 | 13 | 10 | 16 | 10 | 13 |
| Antimony trioxide | 2 | 3 | 3 | — | 3 | 3 | 3 | 3 |
| Calcium hydroxide stabilizer | 4 | 6 | 6 | 6 | 6 | 6 | 6 | 6 |
| Aluminum hydroxide | 50 | 47 | 47 | 50 | 50 | 44 | 50 | 47 |
| Tris-(Octyl, Decyl)-Trimellitate | — | 20 | — | — | — | — | 20 | 20 |
| Steric acid (octadecanoic acid) | 0.2 | 0.2 | 0.2 | 0.2 | 0.2 | 0.2 | 0.2 | 0.2 |
| Magnesium hydroxide | 8 | — | — | — | — | — | — | — |
| Zinc Borate | 5 | — | — | — | — | — | — | — |
| Brominated Plasticizer | 10 | — | — | — | — | — | — | — |
| Blend of 1,2-Benzenedi-carboxylic acid and diundecyl esters ("DUP") | — | — | 20 | 20 | 20 | 20 | — | — |
| Elvaloy ® HP441 (plasticizer) | 30 | — | — | — | — | — | — | — |
| Zinc molybdate coated on Mg(OH)$_2$ | 3 | — | — | — | — | — | — | 10 |
| Loxiol ® G-70S (solid complex ester) | — | — | — | — | — | — | — | 1 |
| Loxiol ® G40 (fatty acid ester) | — | — | — | — | — | — | — | 0.5 |
| Kane Ace ® PA-101 (methacrylate styrene copolymer) | — | — | — | — | — | — | — | 5 |

The properties of Examples 1 to 8 are reproduced in Table 2. As depicted by Table 2, each of the Inventive Examples 2 to 8 exhibited favorable mechanical and electrical properties including a dielectric constant of less than about 3.4 when measured at 10 MHz. and a dissipation factor of less than about 0.02 when measured at 10 MHz. Inventive Example 2 also passed the requirements of NFPA 262 by having a flame propagation distance of 2 feet for both cable samples, an optical smoke density peak of 0.35 and 0.36 and an optical smoke density average of 0.14 and 0.15. Comparative Example 1 exhibited unfavorable properties including a dielectric constant of 3.521 and a dissipation factor of 0.021 when measured at 10 MHz.

TABLE 2

| Property | 1 | 2 | 3 | 4 | 5 | 6 | 7 | 8 |
|---|---|---|---|---|---|---|---|---|
| Unaged elongation, % | — | 94 | 3 | 56 | 81 | 78 | 33 | — |
| Unaged tensile, PSI | — | 4803 | 4430 | 5099 | 4001 | 5288 | 5630 | — |
| LTB, ° C. | 8 | 10 | — | — | — | — | — | — |
| LOI, % | 55.5% | 50.0% | 50% | 39% | 46% | 50.50% | 53% | 46.0% |
| Dielectric Constant @ 1 MHz | 3.606 | 3.376 | 3.356 | 3.368 | 3.366 | 3.328 | 3.394 | 3.3797 |
| Dielectric Constant @ 10 MHz | 3.521 | 3.328 | 3.297 | 3.310 | 3.308 | 3.272 | 3.346 | 3.3243 |
| Dissipation Factor @ 1 MHz | 0.018 | 0.013 | 0.015 | 0.015 | 0.014 | 0.014 | 0.013 | 0.013 |
| Dissipation Factor @ 10 MHz | 0.021 | 0.014 | 0.016 | 0.016 | 0.016 | 0.015 | 0.014 | 0.014 |
| Shore Hardness A | 97 | — | 97 | 97 | 95 | 96 | 96 | 96 |

The dimensions and values disclosed herein are not to be understood as being strictly limited to the exact numerical values recited. Instead, unless otherwise specified, each such dimension is intended to mean both the recited value and a functionally equivalent range surrounding that value.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross-referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests, or discloses any such invention. Further, to the extent that any meaning or definition of a term in this document conflicts with any meaning or definition of the same term in a document incorporated by reference, the meaning or definition assigned to that term in the document shall govern.

The foregoing description of embodiments and examples has been presented for purposes of description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent articles by those of ordinary skill in the art. Rather it is hereby intended the scope be defined by the claims appended hereto.

What is claimed is:

1. A fire retardant composition comprising:
   polyvinyl chloride;
   about 10 parts to about 40 parts, by weight, of a plasticizer comprising one or more of a trimellitate ester and a phosphate ester;
   about 0.1 part to about 25 parts, by weight, of a brominated fire retardant additive;
   about 25 parts to about 75 parts, by weight, of a fire retardant synergist comprising a metal hydroxide;
   about 1 part to about 10 parts, by weight, of a mixed metal stabilizer; and
   wherein the fire retardant composition is substantially free of a halogenated plasticizer.

2. The fire retardant composition of claim 1, wherein the trimellitate ester comprises one or more of tris-(octyl, decyl)-trimellitate, tri (heptyl, nonyl) trimellitate, and linear trinonyltrimellitate.

3. The fire retardant composition of claim 1, wherein the phosphate ester comprises phosphoric acid dodecyl ester diphenyl ester.

4. The fire retardant composition of claim 1, wherein the plasticizer further comprises a phthalate plasticizer comprising diundecyl phthalate.

5. The fire retardant composition of claim 1, wherein the brominated fire retardant additive comprises ethylene bis (tetrabromo phthalimide).

6. The fire retardant composition of claim 1, further comprising about 0.1 part to about 25 parts, by weight, of a second fire retardant additive comprising one or more of antimony trioxide and zinc hydroxystannate.

7. The fire-retardant composition of claim 1, wherein the fire retardant synergist comprises aluminum hydroxide.

8. The fire-retardant composition of claim 1, wherein the mixed metal stabilizer comprises calcium-zinc metal carboxylate.

9. The fire retardant composition of claim 1, further comprising about 0.1 part to about 1 part of a lubricant.

10. The fire retardant composition of claim 1, further comprising about 40 parts or less of a smoke suppressant.

11. The fire retardant composition of claim 10, wherein the smoke suppressant comprises ammonium octamolybdate.

12. The fire retardant composition of claim 1 has a limiting oxygen index of about 50% or greater.

13. The fire retardant composition of claim 1 has a dielectric constant of about 3.4 or less when measured at about 10 MHz.

14. The fire retardant composition of claim 1 has a dissipation factor of about 0.020 or less when measured at about 10 MHz.

15. The fire retardant composition of claim 1 is foamed and has a foam rate of about 30% or less.

16. A cable comprising a cable separator formed of the fire retardant composition of claim 1.

17. The cable of claim 16 passes the requirements of National Fire Protection Association ("NFPA") standard 262.

18. A fire retardant composition comprising:
polyvinyl chloride;
about 10 parts to about 40 parts, by weight, of a plasticizer comprising one or more of a trimellitate ester and a phosphate ester;
about 0.1 part to about 25 parts, by weight, of a brominated fire retardant additive;
about 0.1 to about 25 parts, by weight, of a second fire retardant additive comprising antimony trioxide about 25 parts to about 75 parts, by weight, of a fire retardant synergist comprising a metal hydroxide;
about 1 part to about 10 parts, by weight, of a mixed metal stabilizer; and
wherein the fire retardant composition is substantially free of a halogenated plasticizer.

* * * * *

UNITED STATES PATENT AND TRADEMARK OFFICE
CERTIFICATE OF CORRECTION

PATENT NO. : 10,246,639 B2  
APPLICATION NO. : 15/597486  
DATED : April 2, 2019  
INVENTOR(S) : Amjad F. Abu-Ali et al.

Page 1 of 2

It is certified that error appears in the above-identified patent and that said Letters Patent is hereby corrected as shown below:

In the Specification

Column 6, Line 61, change "("LOT")" to --("LOI")--;
Column 6, Line 63, change "LOT" to --LOI--;
Column 7, Line 35, change "body102can" to --body 102 can--;
Column 7, Line 37, change "body102to" to --body 102 to--;
Column 7, Line 40, change "projections103with" to --projections 103 with--;
Column 7, Line 40, change "103equally" to --103 equally--;
Column 7, Line 42, change "projection103" to --projection 103--;
Column 7, Line 47, change "106located" to --106 located--;
Column 7, Line 47, change "body102,and" to --body 102, and--;
Column 7, Line 48, change "projection103" to --projection 103--;
Column 8, Line 12, change "conductors202surrounded" to --conductors 202 surrounded--;
Column 8, Line 14, change "conductors202can" to --conductors 202 can--;
Column 8, Line 15, change "pairs206" to --pairs 206--;
Column 8, Line 15, change "206can" to --206 can--;
Column 8, Line 19, change "pairs206can" to --pairs 206 can--;
Column 8, Line 20, change "separator100can" to --separator 100 can--;
Column 8, Line 22, change "pairs206" to --pairs 206--;
Column 8, Line 28, change "layer207" to --layer 207--;
Column 8, Line 48, change "100and" to --100 and--;
Column 8, Line 53, change "pairs306" to --pairs 306--;
Column 8, Line 54, change "306can" to --306 can--;
Column 9, Line 6, change "separator400" to --separator 400--;
Column 9, Line 7, change "401can" to --401 can--;
Column 9, Lines 7-8, change "projections403" to --projections 403--;
Column 9, Line 9, change "403of" to --403 of--;
Column 9, Line 14, change "layer407" to --layer 407--;
Column 9, Line 15, change "500in" to --500 in--;
Column 9, Line 17, change "502can" to --502 can--;

Signed and Sealed this  
Twenty-fifth Day of June, 2019

Andrei Iancu  
*Director of the United States Patent and Trademark Office*

CERTIFICATE OF CORRECTION (continued)
U.S. Pat. No. 10,246,639 B2

Column 9, Line 19, change "conductors502" to --conductors 502--;
Column 9, Line 20, change "500can" to --500 can--;
Column 9, Line 21, change "jacket504.As" to --jacket 504. As--;
Column 9, Line 23, change "507.In" to --507. In--;
Column 9, Line 24, change "500can" to --500 can--;
Column 9, Line 34, change "separator600" to --separator 600--;
Column 9, Lines 39-40, change "separator700" to --separator 700--;
Column 9, Line 44, change "702can" to --702 can--;
Column 9, Line 46, change "separators800" to --separators 800--;
Column 9, Line 48, change "800can" to --800 can--;
Column 9, Line 49, change "conductors802" to --conductors 802--;
Column 9, Line 50, change "802against" to --802 against--; and In the Claims Claim 18, Column 13, Line 19, change "trioxide" to --trioxide;--.